UNITED STATES PATENT OFFICE.

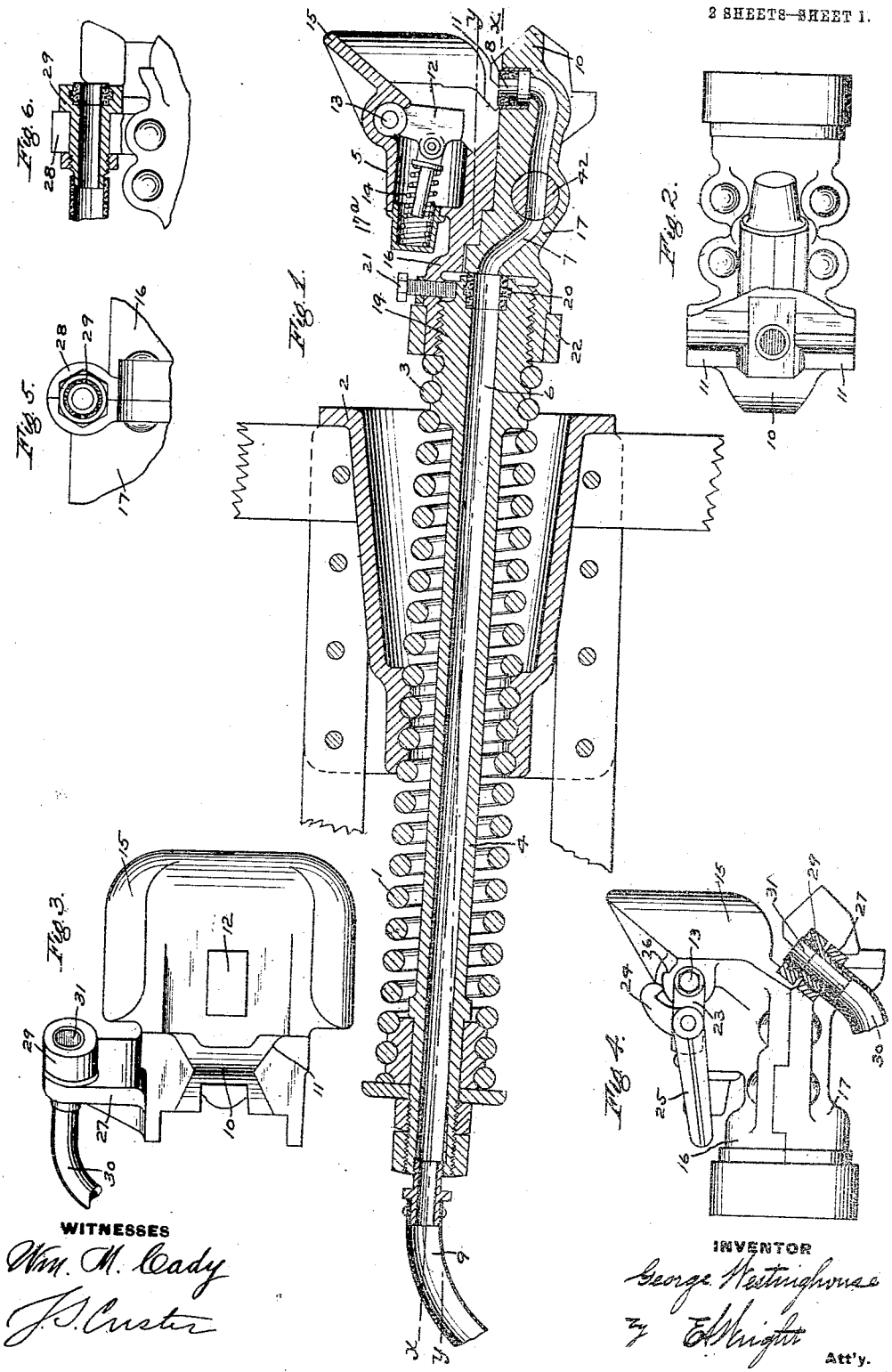

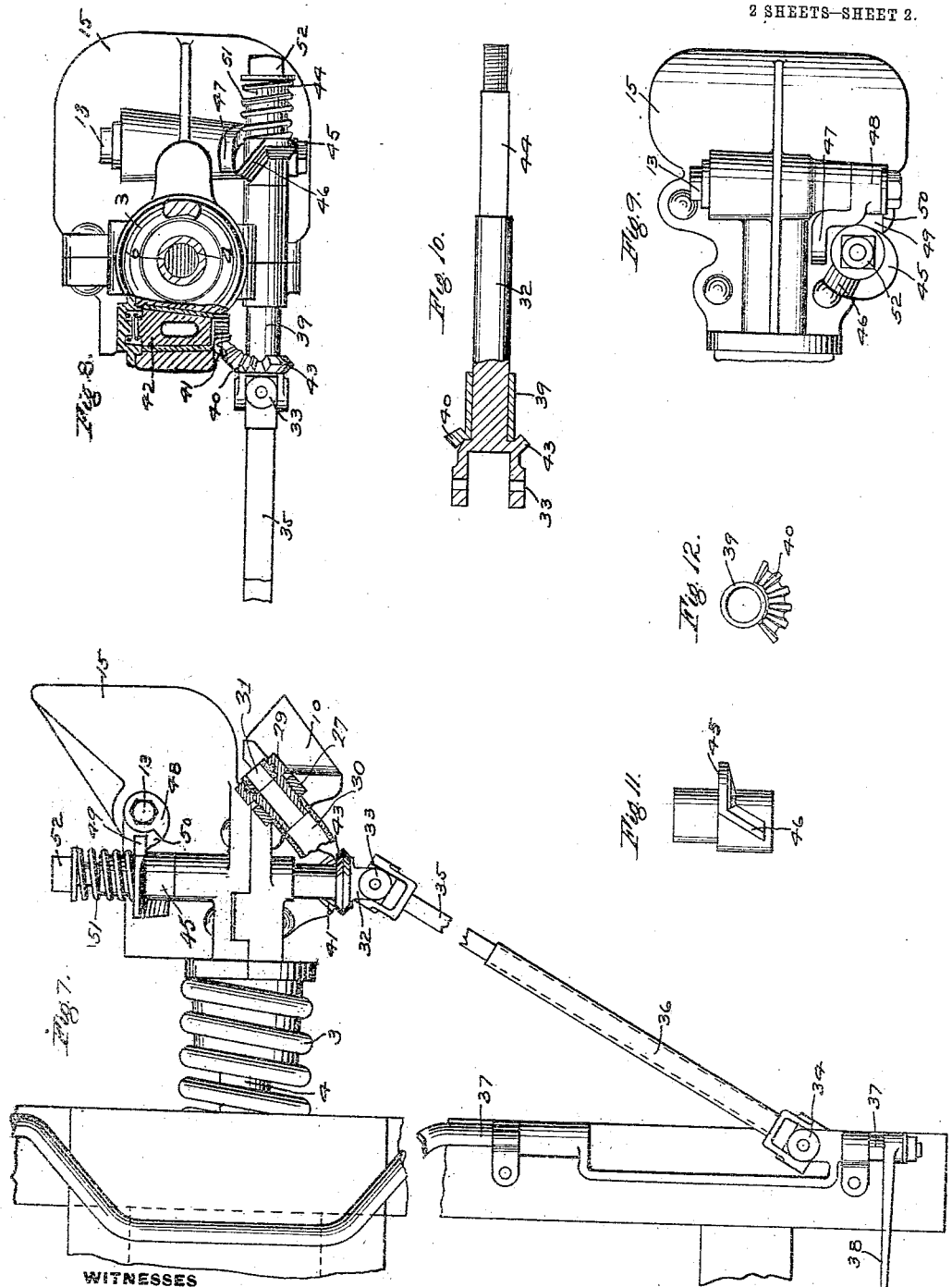

GEORGE WESTINGHOUSE, OF PITTSBURGH, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

COMBINED AUTOMATIC TRAIN-PIPE AND CAR COUPLING MECHANISM.

1,129,323.          Specification of Letters Patent.      Patented Feb. 23, 1915.

Original application filed April 12, 1906, Serial No. 311,284. Divided and this application filed May 23, 1908. Serial No. 434,450.

*To all whom it may concern:*

Be it known that I, GEORGE WESTINGHOUSE, a citizen of the United States, residing at Pittsburgh, in the county of Allegheny and State of Pennsylvania, have invented new and useful Improvements in Combined Automatic Train-Pipe and Car Coupling Mechanism, of which the following is a specification.

This invention relates in general to railway draft appliances, and more particularly to automatic coupling devices for such mechanism, and for train air pipe connections such as employed in air brake or other fluid pressure systems, this application being a division of my former application, Serial No. 311284, filed April 12, 1906.

One object of my invention is to provide a hollow or tubular draw-bar adapted to coöperate with that type of automatic coupler head having a passage leading to an opening in the face of the coupler and adapted to make a fluid tight connection with a similar passage in a counter part coupler when the two are coupled together, whereby the passage through the draw-bar forms part of a conduit for fluid pressure, such as compressed air, through the train.

Another feature of my invention relates to an improved automatic coupler head adapted to coöperate with a laterally flexible draft spring, and having an enlarged gathering hood and preferably formed in two longitudinal parts which may be secured together by any suitable means.

Another object is to provide improved means for manually operating the latch of the automatic coupler, and a cock for controlling the conduit or passage in the coupler head; and still another feature of the invention comprises means carried by the automatic coupler head for connecting additional lines of fluid pressure conduits or electric line circuits.

In the accompanying drawings; Figure 1 is a central horizontal section of a spring draft gear with my improved automatic coupler and tubular draw-bar; Fig. 2 a side elevation of the automatic coupler head, with a part of the gathering hood broken away to show the coupling faces; Fig. 3 an end view of the coupler, showing means for coupling an additional fluid pressure conduit; Fig. 4 a plan view of the coupler head with the end of the additional fluid pressure conduit shown in horizontal section; Figs. 5 and 6 fragmentary views showing an end elevation and longitudinal section of a modified form of additional coupling; Fig. 7 an inverted plan of a modified form of coupler head and a part of the end of a car, showing an improved mechanism for manually operating the latch and cock from the side of the car; Fig. 8 a transverse section with parts broken away to more fully show certain detail connections but with the additional port shown in Fig. 7 omitted; Fig. 9 a side elevation of a portion of the coupler head showing a cam and lever for operating the latch, this view also having the additional port of Fig. 7 omitted; Fig. 10 a horizontal section of the operating shaft; Fig. 11 a detail view of the cam device; Fig. 12 a detail view of the segmental gear for operating the cock.

According to the construction shown in Fig. 1 my present improvements are shown applied in connection with a spring draft gear similar to that covered in the hereinbefore mentioned application, and comprises tubular draw-bar 4 which extends longitudinally through the coil of a draft spring, the section 3 of which is fastened to the head 19 of the draw-bar, while the section 1 extends inwardly toward the car. The spring is supported at a central or intermediate portion of a casing 2, having an outwardly arranged flaring portion, so that owing to the elesticity of the spring, the ends of the spring sections 1 and 3 have a certain lateral flexibility which permits a limited transverse movement of the coupler or end of the draw-bar to which these spring sections may be connected.

The draw-bar 4 is provided with a passage 6 extending therethrough and connected at its outer end to my improved form of automatic coupler head 17$^a$, having a registering passage 7 leading to the gasket opening 8 in the face of the coupler, for coupling a fluid pressure conduit, such as compressed air line through the train, a hose 9 being connected at the inner end of the draw-bar.

The automatic coupling head 17$^a$ is similar in some respects to that covered by my prior Patent, No. 708,747, of September 9, 1902, comprising the forward projecting portion 10 on one side and a recess portion on the other side, adapted to engage a corresponding recess and projection of a counterpart coupling on an adjacent car when the two are coupled together; the longitudinal face of the coupling being provided with vertical ribs 11 having inclined sides for locking against corresponding ribs on the co-acting coupling head. A latch or locking lever 12 is pivoted on the vertical shaft 13 and is normally pressed outwardly by the spring 14 for engaging a suitable bearing surface on the outer side of the projecting portion 10 of a counterpart coupler, after the vertical rib portions 11 have slipped past each other and thereby firmly lock the two coupler heads together, all as fully set forth in my prior patent above referred to.

According to my present improvements, an enlarged gathering hood 15 is provided for the purpose of obtaining an automatic engagement of the two parts of the coupler, even though these are laterally somewhat out of alinement, due to track curvature, or other reasons, and in order to facilitate the machining of the surfaces, the coupler head is preferably formed in two longitudinal parts 16 and 17, which may be secured together by transverse bolts, as indicated. Another advantage of this divided arrangement is that, in case of breakage of the hood or other part, it is only necessary to renew one half of the coupler head.

The head 19 of the draw-bar may be screwed into the shank of the coupler head, as shown, and in order to provide a tight joint for the pressure conduit at this point, a gasket 20 may be mounted in the head of the bar and bear against the coupler around the opening of the passage 6, when the parts are tightly screwed together and clamped by suitable means, such as a set screw 21.

A ring 22 may be forced onto the shaft of the coupler to prevent any tendency of the threaded parts of the coupler to spread at this point. For manually operating the locking lever 12, a crank arm 23 may be provided on the upper end of the shaft 13, and on this arm is pivoted a hook-shaped pawl 24 having a handle 25, which may be moved around until the pawl engages a notch 26 on the casing and thereby hold the lever 12 in its release position with spring 14 compressed. This is the position for uncoupling, but when two members are to be coupled the pawl 24 should be released from the notches in order to allow the springs 14 to force the levers 12 to locking position.

If it be desired to provide a coupling for one or more additional fluid pressure conduits or electric circuits through the train, this may be done by forming a vertical lug 27 on the coupler head, as shown in Figs. 3 and 4, or a divided lug 28, as shown in Figs. 5 and 6, for supporting a nipple 29 which may carry means for coupling electric conductors or a fluid pressure conduit.

If an additional pipe line 30 is connected to the nipple, a gasket opening 31 may be arranged vertically over and substantially at right angles to the inner inclined face of the rib 11 on the coupler face, as shown in Figs. 3 and 4, so that as the two coupler heads slide upon each other into locking position the gaskets 31 of the two counterpart couplers will be forced and clamped directly against each other forming a tight butt joint.

It will be noticed that the coil spring sections 1 and 3 are so arranged in a fixed casing 2 that the axis of the spring and coupler head, indicated by the dotted line $x-x$ makes an angle with the center line of the car, indicated by the dotted line $y-y$, so that the coupler head is normally deflected a slight distance to one side of the center line of the car. This is for the purpose of facilitating the coupling of the cars upon a curved track and to insure the engagement of the pointed projection 10 of one coupler head with the counterpart coupler head on the gathering hood side of its corresponding projection. If the coupler heads were normally located on the center lines of the cars, it might happen that in an attempt to couple the cars together on a curved track the projecting portions 10 of the two coupler heads would engage each other upon their outer sides and thus fail to couple together automatically, but this cannot occur where the coupler heads are normally deflected sufficiently to one side of the center line, as illustrated in the drawing.

After the two members are coupled together, and the draft stresses are applied the springs readily flex laterally, so that the axes of the two members are brought into alinement.

If desired a stop cock 42 may be mounted in the part 17 of the coupler head for controlling the passage 7 of the fluid pressure conduit, and means may be employed for manually operating the coupler latch and the cock from the side of the car. Such a mechanism may preferably be designed to embody a flexible connection to the operating devices on the coupler head, in order not to interfere with lateral swinging movement of the coupler on the end of the elastic spring section, and this constitutes one of the important features of my invention.

One form of flexible mechanical connection embodying this feature of my improvement is illustrated on Sheet 2 of the drawings, wherein an operating shaft 32 is transversely mounted in a bearing on the coupler head and connected by universal joints 33 and 34 and square telescoping rod sections 35 and 36 with a manually operated shaft 37, extending across the end of the car and provided with handles 38 at its opposite ends for rotating said shaft to its different positions.

On one portion of the operating shaft 32 is mounted a sleeve 39 having a segmental bevel gear 40, adapted to mesh with a corresponding segmental bevel gear 41 on the stem of the cock 42, while a segmental projection 43 on the shaft 32 serves to engage the segmental gear 40, and also permits a lost motion or small independent movement of the shaft relative to the sleeve 39.

On a square portion 44 of the shaft 32 is mounted a cam device 45 having a projection 46 with a curved surface adapted to engage a curved end 47 of a lever arm 48 mounted on the stem or shaft 13 of the latch 12 of the coupler. The cam device 45 may also be provided with a projecting lug 49 adapted in one position to engage a notch 50 in the lever 48, so that the spring 51, which is mounted on the shaft 32 between the cam device 45 and an adjustable nut 52, serves to assist the latch spring 14 to hold the latch 12 in its locked position when two members are coupled together.

When it is desired to uncouple, the handle 38 is partially rotated, the same movement being transmitted through the flexible connection to the shaft 32, the segment 43 engages the segmental gear 40 causing the same to operate the gear 41 and close the cock 42, at the same time the lug 49 is withdrawn from the notch 50 and by a further movement the cam surface 46 engages the curved lever 47 and rotates the stem 13 to withdraw the latch 12 and release the coupler. When two cars are to be coupled together, the handles 38 are partially rotated in the opposite direction, thereby turning the shaft 32 sufficiently to release the cam from the latch lever and permit the spring 14 to extend the latch 12. The lost motion between the segments 43 and 40 allows for this movement of the shaft without actuating the gears 40 and 41 or the cock 42. The coupler heads of the adjacent ends of the cars are then brought together by impact, the members engaging each other and the latch springing out to lock said members together in the usual way. The handles 38 are then given a further partial turn to rotate the gears 40 and 41 and open the cock 42, at the some time the lug 49 is moved into the notch 50 of the latch lever so that the latch cannot then be unlocked without compressing both the springs 14 and 51, thereby preventing any accidental uncoupling of the members.

It will now be apparent that by means of the flexible mechanical connections between the hand operated shaft at the side of the car and the operating device carried on the coupler head, the lateral or swinging movement of the coupler head will not be interfered with in any manner, and furthermore, that however much the coupler may be deflected from the center line, both the latch and the cock controlling the fluid pressure conduit may be readily manipulated from the side of the car, thereby rendering it unnecessary to go between the cars for any purpose during the operation of coupling and uncoupling.

Having now described my invention, what I claim as new and desire to secure by Letters Patent, is:—

1. In a combined pipe and car coupler, the combination with an automatic coupler head having an air passage and cock and subject to a lateral swinging movement, of telescoping rod sections operatively connected to said cock for turning the same and manually operated means extending from the side of the car for operating said rod sections.

2. In a combined pipe and car coupling, an automatic coupler head having a projecting portion with a vertical locking rib provided with an inclined side, means for locking the same against a corresponding face of a counterpart coupling, and a fluid pressure conduit having an opening containing a gasket arranged substantially at right angles to the inclined face of the locking rib.

3. In a combined pipe and car coupling, an automatic coupler having a spring actuated latch mechanism and a cock for controlling a fluid pressure conduit, an operating shaft mounted on the coupler and provided with a cam device for operating the latch mechanism, and a gear connection for operating the cock, an additional spring, and means for causing said spring to act upon the latch mechanism to assist in holding the same in locked position.

4. In a combined pipe and car coupler, an automatic coupler having a spring actuated latch mechanism and a cock for controlling a fluid pressure conduit, an additional spring, and manually operated means for causing said spring to act upon the latch mechanism to assist in holding the same in locked position and for operating said cock.

In testimony whereof I have hereunto set my hand.

GEO. WESTINGHOUSE.

Witnesses:
Wm. H. Capel,
H. C. Tener.